US012675852B2

(12) United States Patent
Yang et al.

(10) Patent No.: US 12,675,852 B2
(45) Date of Patent: Jul. 7, 2026

(54) IMAGE PROCESSING METHOD, ELECTRONIC DEVICE, AND READABLE STORAGE MEDIUM

(71) Applicants: ANKON TECHNOLOGIES CO., LTD, Wuhan (CN); ANX IP HOLDING PTE. LTD., Singapore (SG)

(72) Inventors: Hua Yang, Wuhan (CN); Tianyi Yangdai, Wuhan (CN); Hui Liu, Wuhan (CN); Hao Zhang, Wuhan (CN)

(73) Assignees: ANKON TECHNOLOGIES CO., LTD, Wuhan (CN); ANX IP HOLDING PTE. LTD., Singapore (SG)

( * ) Notice: Subject to any disclaimer, the term of this patent is extended or adjusted under 35 U.S.C. 154(b) by 315 days.

(21) Appl. No.: 18/263,882

(22) PCT Filed: Jan. 10, 2022

(86) PCT No.: PCT/CN2022/071042
§ 371 (c)(1),
(2) Date: Aug. 1, 2023

(87) PCT Pub. No.: WO2022/161145
PCT Pub. Date: Aug. 4, 2022

(65) Prior Publication Data
US 2024/0303782 A1     Sep. 12, 2024

(30) Foreign Application Priority Data
Feb. 1, 2021    (CN) ........................ 202110132848.X

(51) Int. Cl.
*G06T 5/70* (2024.01)
*G06T 3/40* (2024.01)
(Continued)

(52) U.S. Cl.
CPC .................. *G06T 5/70* (2024.01); *G06T 3/40* (2013.01); *G06T 5/20* (2013.01); *G06T 5/50* (2013.01);
(Continued)

(58) Field of Classification Search
None
See application file for complete search history.

(56) References Cited

FOREIGN PATENT DOCUMENTS

| CN | 108683826 A | 10/2018 |
| CN | 109003246 A | 12/2018 |

(Continued)

*Primary Examiner* — Thomas D Lee
(74) *Attorney, Agent, or Firm* — Treasure IP Group, LLC

(57) ABSTRACT

An image processing method, an electronic device, and a readable storage medium are provided. The method includes: obtaining an original image; denoising the original image using an image filtering algorithm to form a preprocessed image S; performing contrast enhancement in the preprocessed image S to form a contrast-enhanced image J; adjusting saturation of the contrast-enhanced image J to form an enhanced display image M; sharpening the enhanced display image M to form a sharpened image N; and performing dynamic range enhancement on the sharpened image N using a dynamic range image enhancement algorithm to form an output image. The image processing method, electronic device, and readable storage medium enable multi-level processing on the original image and improve the display accuracy of the output image.

8 Claims, 5 Drawing Sheets

(51) Int. Cl.
*G06T 5/20*        (2006.01)
*G06T 5/50*        (2006.01)
*G06T 5/73*        (2024.01)
*G06T 5/94*        (2024.01)

(52) U.S. Cl.
CPC .................. *G06T 5/73* (2024.01); *G06T 5/94* (2024.01); *G06T 2207/10024* (2013.01); *G06T 2207/20016* (2013.01); *G06T 2207/30004* (2013.01)

(56)                    References Cited

FOREIGN PATENT DOCUMENTS

| | | | | |
|---|---|---|---|---|
| CN | 109089043 | A | 12/2018 | |
| CN | 110175969 | A | 8/2019 | |
| CN | 110775930 | A | 2/2020 | |
| CN | 111161170 | A | 5/2020 | |
| CN | 111898532 | A | 11/2020 | |
| EP | 3460747 | A1 * | 3/2019 | .............. G06T 7/97 |

* cited by examiner

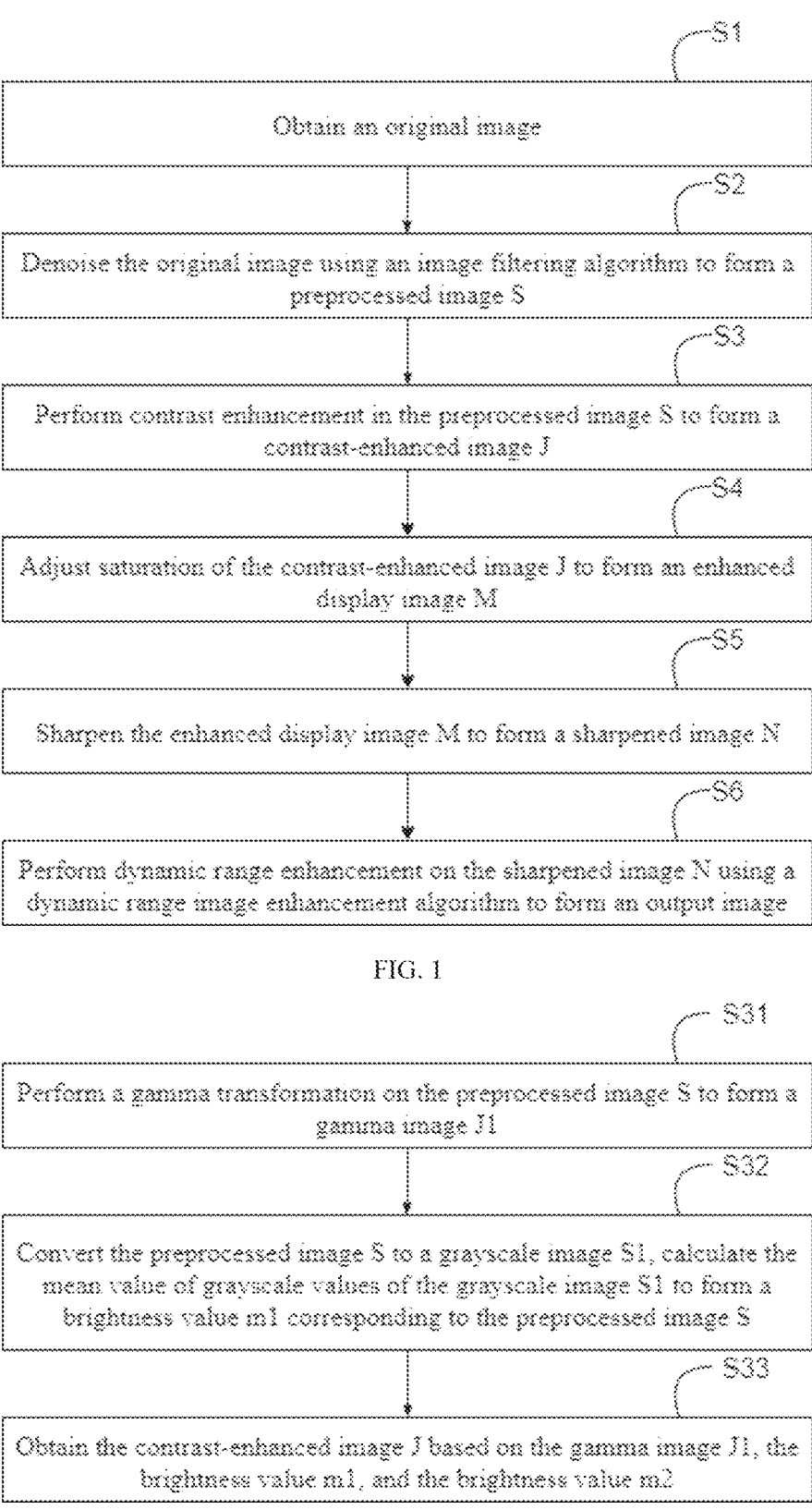

S1

Obtain an original image

S2

Denoise the original image using an image filtering algorithm to form a preprocessed image S

S3

Perform contrast enhancement in the preprocessed image S to form a contrast-enhanced image J

S4

Adjust saturation of the contrast-enhanced image J to form an enhanced display image M

S5

Sharpen the enhanced display image M to form a sharpened image N

S6

Perform dynamic range enhancement on the sharpened image N using a dynamic range image enhancement algorithm to form an output image

Perform a gamma transformation on the preprocessed image S to form a gamma image J1

S32

Convert the preprocessed image S to a grayscale image S1, calculate the mean value of grayscale values of the grayscale image S1 to form a brightness value m1 corresponding to the preprocessed image S

S33

Obtain the contrast-enhanced image J based on the gamma image J1, the brightness value m1, and the brightness value m2

Figure 3:
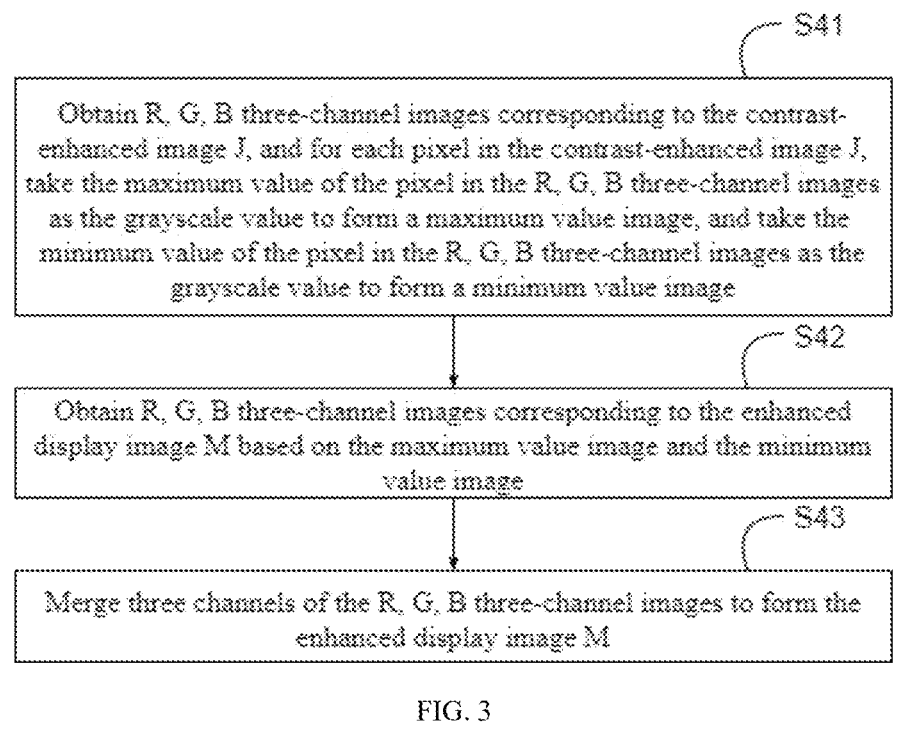

Obtain R, G, B three-channel images corresponding to the contrast-enhanced image J, and for each pixel in the contrast-enhanced image J, take the maximum value of the pixel in the R, G, B three-channel images as the grayscale value to form a maximum value image, and take the minimum value of the pixel in the R, G, B three-channel images as the grayscale value to form a minimum value image

S42

Obtain R, G, B three-channel images corresponding to the enhanced display image M based on the maximum value image and the minimum value image

S43

Merge three channels of the R, G, B three-channel images to form the enhanced display image M

Obtain the R, G, B three-channel images corresponding to the sharpened image N, and for each pixel in the sharpened image N, take the maximum value corresponding in the R, G, B three-channel images as the grayscale value to form an initial image L1

S62

Perform mean filtering on the initial image L1 to form a light image L

S63

Calculate the total number of pixels P1 with grayscale values less than a preset second grayscale threshold in the light image L

P1≤P

P1>P

Use the sharpened image N as the output image E

S64

Calculate a mean grayscale value mean of the pixels with grayscale values less than the preset second grayscale threshold in the light image L, and obtain an exposure image G according to the mean grayscale value mean

S65

Obtain R, G, B three-channel images corresponding to the output image E based on the exposure image G and the sharpened image N

S66

Merge three channels of the R, G, B three-channel images to form the output image E

FIG. 4

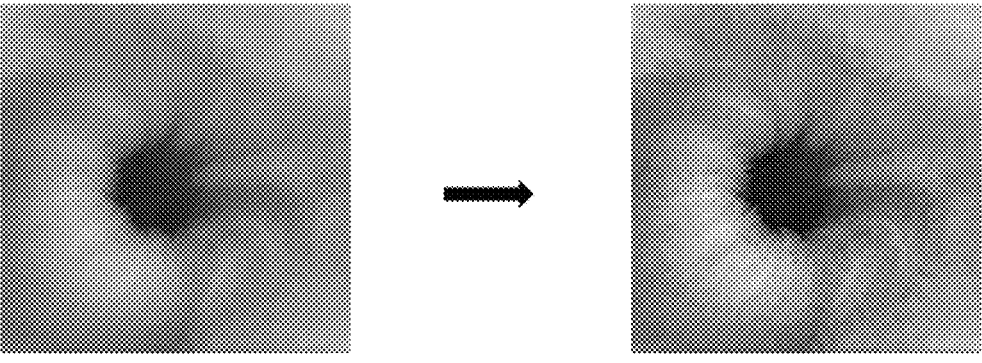

FIG. 5

Figure 6:
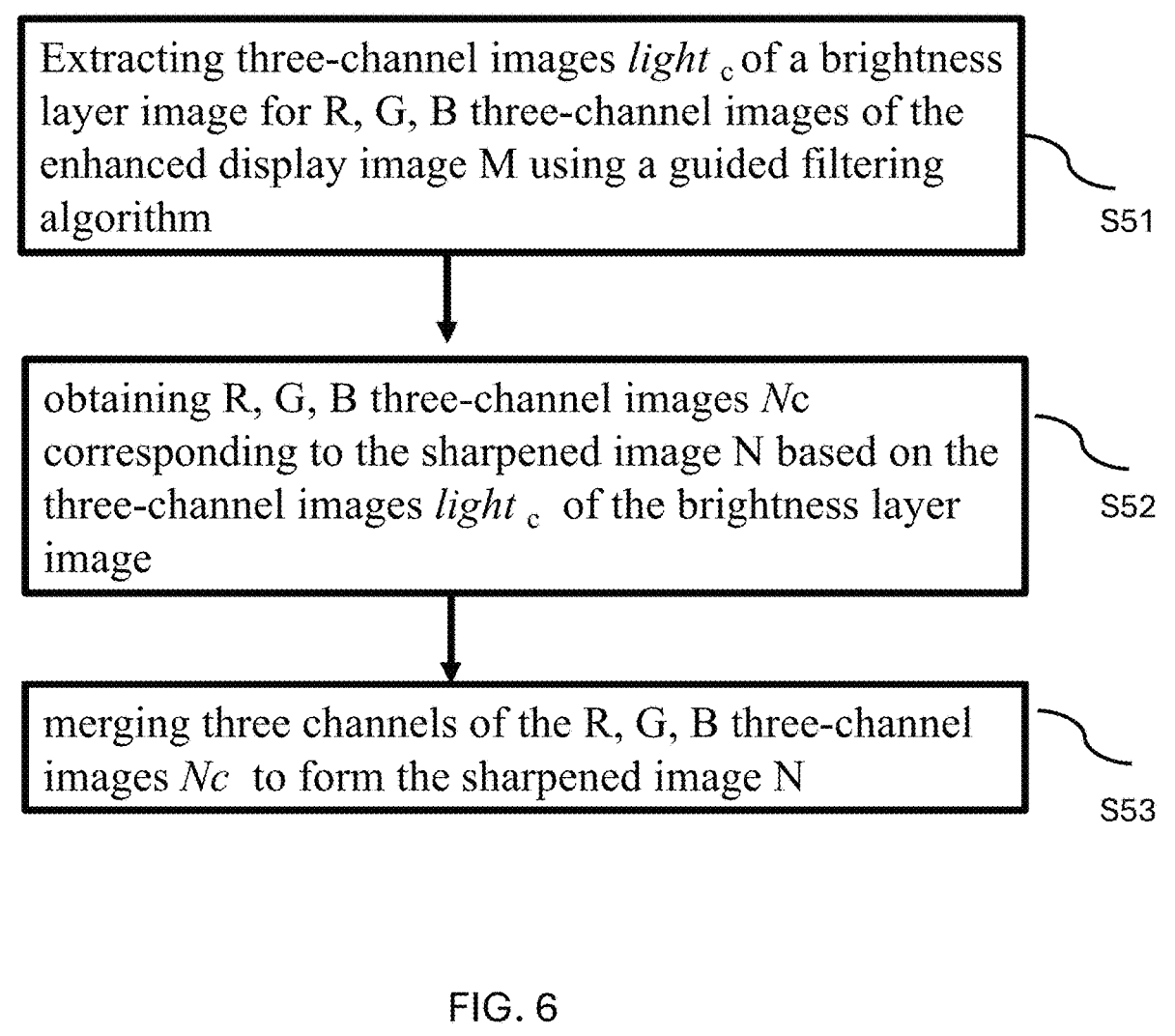

Extracting three-channel images $light_c$ of a brightness layer image for R, G, B three-channel images of the enhanced display image M using a guided filtering algorithm

S51 obtaining R, G, B three-channel images $Nc$ corresponding to the sharpened image N based on the three-channel images $light_c$ of the brightness layer image

S52 merging three channels of the R, G, B three-channel images $Nc$ to form the sharpened image N

S53

FIG. 6 downsampling the enhanced display image M before step S51 to form a downsampled image replacing the enhanced display image M with the downsampled image when performing step S51 after step S51, upsampling the three-channel images $light_c$ formed in step S51 to form three-channel images $light_c$ with the same size as the original image

FIG. 7

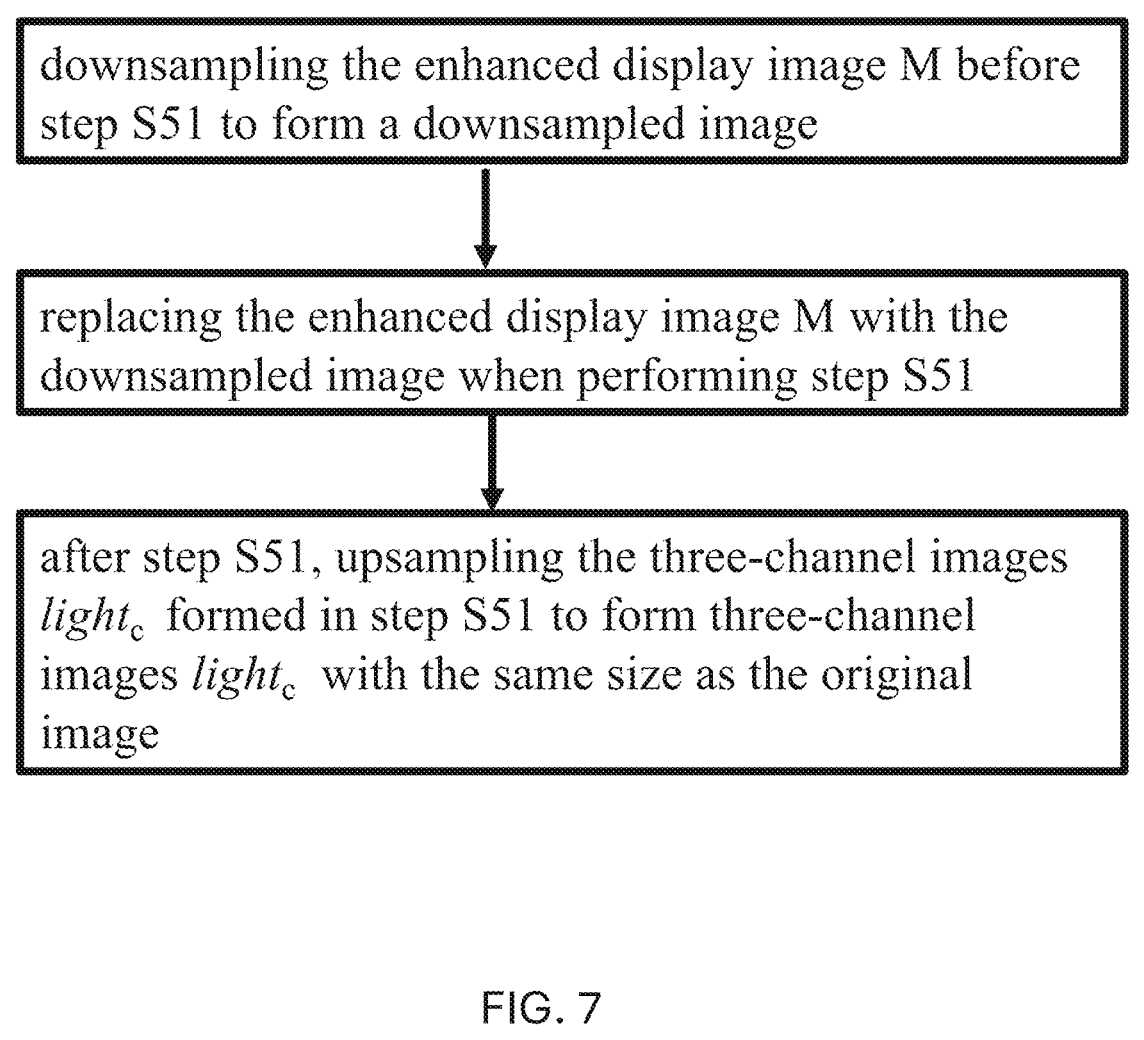

IMAGE PROCESSING METHOD, ELECTRONIC DEVICE, AND READABLE STORAGE MEDIUM

CROSS-REFERENCE OF RELATED APPLICATIONS

The application claims priority from Chinese Patent Application No. 202110132848.X, filed Feb. 1, 2021, entitled "Image Processing Method, Electronic Device and Readable Storage Medium", all of which are incorporated herein by reference in their entirety.

FIELD OF INVENTION

The present invention relates to the field of medical device imaging, and more particularly to an image processing method, an electronic device, and a readable storage medium.

BACKGROUND

A capsule endoscope is increasingly used for digestive tract examinations. The capsule endoscope is ingested by a patient, which travels through mouth, esophagus, stomach, small intestine, and large intestine of the patient, and is finally excreted. Usually, the capsule endoscope travels passively with the peristalsis of the digestive tract, and takes images at a certain frame rate during this process, so that a doctor can check the conditions of regions of the digestive tract of the patient.

Small intestinal mucosa images, for example, may have issues with low brightness, blurriness, and poor quality due to the size, power consumption, and photography environment restrictions of the capsule endoscope. This results in too low accuracy in the original small intestinal mucosa images, which is bad for lesion analysis and diagnosis.

SUMMARY OF THE INVENTION

To solve the above technical problems, it is an object of the present invention to provide an image processing method, an electronic device, and a readable storage medium.

In order to achieve one of the above objects of the present invention, an embodiment of the present invention provides an image processing method, comprising: obtaining an original image;

denoising the original image using an image filtering algorithm to form a preprocessed image S;

performing contrast enhancement in the preprocessed image S to form a contrast-enhanced image J;

adjusting saturation of the contrast-enhanced image J to form an enhanced display image M;

sharpening the enhanced display image M to form a sharpened image N; and performing dynamic range enhancement on the sharpened image N using a dynamic range image enhancement algorithm to form an output image.

In an embodiment of the present invention, the step "denoising the original image using an image filtering algorithm to form a preprocessed image S" comprises:

taking a Gaussian filtering algorithm or a mean filtering algorithm as the image filter algorithm, representing the value of each pixel in the preprocessed image S as S(i,j), $$S(i,j) = \text{blur}(I(i,j), \text{size}(r,r))$$

wherein, blur represents filtering function, I(i,j) represents the value of the pixel at coordinates (i,j) in the original image, size(r,r) represents the size of the filtering algorithm, r represents a filtering algorithm parameter, r is a constant, and its numerical value is related to the size of the original image and the noise level of the original image.

In an embodiment of the present invention, the step "performing contrast enhancement in the preprocessed image S to form a contrast-enhanced image J" comprises:

performing a gamma transformation on the preprocessed image S to form a gamma image J1;

converting the preprocessed image S to a grayscale image S1, calculating the mean value of grayscale values of the grayscale image S1 to form a brightness value m1 corresponding to the preprocessed image S;

converting the gamma image J1 to a grayscale image J2, obtaining pixels in the grayscale image J2 with grayscale values greater than a preset first grayscale threshold, calculating the mean value of grayscale values of the obtained pixels to form a brightness value m2 corresponding to the gamma image J1;

obtaining the contrast-enhanced image J based on the gamma image J1, the brightness value m1 corresponding to the preprocessed image S, and the brightness value m2 corresponding to the gamma image J1;

$$J(i, j) = \beta * J1(i, j),$$

$$\beta = \begin{cases} 1, & m2 \geq m1 \\ \dfrac{\min(m1, m2 + v)}{m2}, & m2 < m1 \end{cases},$$

wherein v is a constant, $J1(i,j)$ represents the value of the pixel at coordinates (i,j) in the gamma image J1, and J(i,j) represents the value of the pixel at coordinates (i,j) in the contrast-enhanced image J.

In an embodiment of the present invention, the step "adjusting saturation of the contrast-enhanced image J to form an enhanced display image M" comprises:

obtaining R, G, B three-channel images corresponding to the contrast-enhanced image J, and for each pixel in the contrast-enhanced image J, taking the maximum value of the pixel in the R, G, B three-channel images as the grayscale value to form a maximum value image $M_{max}$, and taking the minimum value of the pixel in the R, G, B three-channel images as the grayscale value to form a minimum value image $M_{min}$;

obtaining R, G, B three-channel images $M_c$ corresponding to the enhanced display image M based on the maximum value image $M_{max}$ and the minimum value image $M_{min}$;

$$M_c(i, j) = L + (J_c(i, j) - L) * (1 + K),$$

$$L = \frac{M(i, j)_{max} + M(i, j)_{min}}{2};$$

wherein, c=[R,G,B], representing one of three channels R, G, B, K is a constant, $M_c(i, j)$ represents the value of the pixel at coordinates (i, j) in one of the R, G, B three-channel images corresponding to the enhanced display image M, $J_c(i, j)$ represents the value of the pixel at coordinates (i, j) in one of the R, G, B three-channel images corresponding to the contrast-enhanced image J, $M(i, j)_{max}$ represents the value of the pixel at coordinates (i, j) in the maximum value image $M_{max}$, and $M(i, j)_{min}$ represents the value of the pixel at coordinates (i, j) in the minimum value image $M_{min}$;

merging three channels of the R, G, B three-channel images $M_c$ to form the enhanced display image M.

In an embodiment of the present invention, the step "sharpening the enhanced display image M to form a sharpened image N" comprises:

sharpening the enhanced display image M using a Laplacian pyramid algorithm to form the sharpened image N.

In an embodiment of the present invention, the step "sharpening the enhanced display image M to form a sharpened image N" comprises:

step S51, extracting three-channel images $\text{light}_c$ of a brightness layer image for R, G, B three-channel images of the enhanced display image M using a guided filtering algorithm;

step S52, obtaining R, G, B three-channel images $N_c$ corresponding to the sharpened image N based on the three-channel images $\text{light}_c$ of the brightness layer image;

$$N_c(i, j) = M_c(i, j) + (M_c(i, j) - \text{light}_c(i, j)) * \alpha, \qquad 25$$

wherein, c=[R,G,B], representing one of three channels R, G, B, $\alpha$ is a constant, $M_c(i, j)$ represents the value of the pixel at coordinates (i,j) in one of the R, G, B three-channel images corresponding to the enhanced display image M, $N_c(i, j)$ represents the value of the pixel at coordinates (i,j) in one of the R, G, B three-channel images corresponding to the sharpened image N, and $\text{light}_c(i, j)$ represents the value of the pixel at coordinates (i,j) in one of the three-channel images of the brightness layer image;

step S53, merging three channels of the R, G, B three-channel images $N_c$ to form the sharpened image N.

In an embodiment of the present invention, the method further comprises:

downsampling the enhanced display image M before step S51 to form a downsampled image;

replacing the enhanced display image M with the downsampled image when performing step S51; and after step S51, upsampling the three-channel images $\text{light}_c$ formed in step S51 to form three-channel images $\text{light}_c$ with the same size as the original image.

In an embodiment of the invention, the dynamic range image enhancement algorithm is local histogram enhancement algorithm or Retinex enhancement algorithm.

In an embodiment of the present invention, the step "performing dynamic range enhancement on the sharpened image N using a dynamic range image enhancement algorithm to form an output image" comprises:

step S61, obtaining R, G, B three-channel images of the sharpened image N, and for each pixel in the sharpened image N, taking the maximum value corresponding in the R, G, B three-channel images as the grayscale value to form an initial image L1;

step S62, performing mean filtering on the initial image L1 to form a light image L;

step S63, calculating the total number of pixels P1 with grayscale values less than a preset second grayscale threshold in the light image L, wherein if P1≤P, the sharpened image N is used as the output image E; and if P1>P, performing steps S64, S65, and S66 sequentially; wherein P is a preset determination threshold, which is a constant;

step S64, calculating a mean grayscale value mean of the pixels with grayscale values less than the preset second grayscale threshold in the light image L; and obtaining an exposure image G according to the mean grayscale value mean, $$G(i, j) = \text{beta} * N(i, j)^q,$$
$$\text{beta} = \exp((1 - q) * b),$$
$$q = k^a;$$
$$k = 135/\text{mean},$$
$$k = \max(1, \min(k, 7));$$

wherein, a and b are constants, G(i,j) represents the value of the pixel at coordinates (i,j) in the exposure image G, and N(i,j) represents the value of the pixel at coordinates (i,j) in the sharpened image N;

step S65, obtaining R, G, B three-channel images $E_c$ corresponding to the output image E based on the exposure image G and the sharpened image N;

$$E_c(i, j) = N_c(i, j) * \omega + G_c(i, j) * (1 - \omega),$$
$$\omega = 1/L(i, j)^f;$$
$$f = \frac{P1}{w * h};$$

wherein, c=[R,G,B], representing one of three channels R, G, and B, P1 is a constant, $E_c(i, j)$ represents the value of the pixel at coordinates (i, j) in one of the R, G, B three-channel images corresponding to the output image E, $N_c(i, j)$ represents the value of the pixel at coordinates (i, j) in one of the R, G, B three-channel images corresponding to the sharpened image N, $G_c(i, j)$ represents the value of the pixel at coordinates (i, j) in one of R, G, B three-channel images corresponding to the exposure image G, L(i,j) represents the value of the pixel at coordinate (i,j) in the light image L; w and h represent the width and height of the sharpened image N, respectively; f is the proportion of the total number of pixels P1 with grayscale values less than the preset second grayscale threshold in the light image L; ω is a weight coefficient, which is normalized to a value between 0 and 1;

step S66, merging three channels of the R, G, B three-channel images $E_c$ to form the output image E.

In order to achieve one of the above objects of the present invention, an embodiment of the present invention provides an electronic device, comprising a memory and a processor, wherein, the memory stores a computer program that can run on the processor, and the processor executes the computer program to implement steps of the image processing method.

In order to achieve one of the above objects of the present invention, an embodiment of the present invention provides a computer-readable storage medium which stores a computer program and the computer program is executed by the processor to implement steps of the image processing method.

According to the embodiments of the present invention, the image processing method, the electronic device, and the readable storage medium enable multi-level processing on the original image and improve the display accuracy of the output image.

BRIEF DESCRIPTION OF THE DRAWINGS

FIG. 1 is an exemplar flowchart diagram of an image processing method, in accordance with an embodiment of the present invention.

FIG. 2 is an exemplar flowchart diagram illustrating a preferred embodiment of step S3 in FIG. 1.

FIG. 3 is an exemplar flowchart diagram illustrating a preferred embodiment of step S4 in FIG. 1.

FIG. 4 is an exemplar flowchart diagram illustrating a preferred embodiment of step S6 in FIG. 1.

FIG. 5 is a structural schematic diagram of a specific example of the present invention.

DETAILED DESCRIPTION

The present invention will be described in detail below with reference to the accompanying drawings and preferred embodiments. However, the embodiments are not intended to limit the invention, and the structural, method, or functional changes made by those skilled in the art in accordance with the embodiments are included in the scope of the present invention.

Referring to FIG. 1, a first embodiment of the present invention provides an image processing method, the image processing method comprises:

step S1, obtaining an original image;

step S2, denoising the original image using an image filtering algorithm to form a preprocessed image S;

step S3, performing contrast enhancement in the preprocessed image S to form a contrast-enhanced image J;

step S4, adjusting saturation of the contrast-enhanced image J to form an enhanced display image M;

step S5, sharpening the enhanced display image M to form a sharpened image N; and step S6, performing dynamic range enhancement on the sharpened image N using a dynamic range image enhancement algorithm to form an output image.

It should be noted that steps S1 to S6 of the present invention need to be performed in sequence to achieve the desired effects. Preferably, the image processing method of the present invention is for small intestinal mucosa images.

In a preferred embodiment of the present invention, step S2 comprises: taking a Gaussian filtering algorithm or a mean filtering algorithm as the image filter algorithm, representing the value of each pixel in the preprocessed image S as S(i,j), then $$S(i, j) = \mathrm{blur}\ (I(i, j), \mathrm{size}\ (r, r)),$$

where, blur represents filtering function, I(i,j) represents the value of the pixel at coordinates (i,j) in the original image, size(r,r) represents the size of the filtering algorithm, r represents the filtering algorithm parameter, r is a constant, and its numerical value is related to the size of the original image and the noise level of the original image.

Accordingly, the value of the filtering algorithm parameter r is configured to increase as the size of the original image increases, and the value of the filtering algorithm parameter r is also configured to increase as the noise level of the original image increases.

In the specific examples of the present invention, the value of r may be configured as 3, 5, or 7.

By step S2 of the present invention, it can reduce the interference of the image by the noise of a capsule endoscope itself as well as the external environment, etc., during the process of image acquisition and transmission.

In a preferred embodiment of the present invention, as shown in FIG. 2, step S3 comprises: step S31, performing a gamma transformation on the preprocessed image S to form a gamma image J1;

it can be expressed by the formula:

$$J1(i, j) = S^g(i, j),$$

where g is a gamma coefficient, J1(*i,j*) represents the value of the pixel at coordinates (i,j) in gamma image J1; $S^g$(i, j) represents a gamma transformation for the value of the pixel at coordinates (i,j) in the preprocessed image S; in specific examples of the present invention, $g \in [0.1, 3.0]$;

step S32, converting the preprocessed image S to a grayscale image S1, calculating the mean value of grayscale values of the grayscale image S1 to form a brightness value m1 corresponding to the preprocessed image S;

converting the gamma image J1 to a grayscale image J2, obtaining pixels in the grayscale image J2 with grayscale values greater than a preset first grayscale threshold, calculating the mean value of grayscale values of the obtained pixels to form a brightness value m2 corresponding to the gamma image J1;

step S33, obtaining the contrast-enhanced image J based on the gamma image J1, the brightness value m1 corresponding to the preprocessed image S, and the brightness value m2 corresponding to the gamma image J1;

then $$J(i, j) = \beta * J1(i, j),$$

$$\beta = \begin{cases} 1, & m2 \geq m1 \\ \dfrac{\min(m1, m2 + v)}{m2}, & m2 < m1 \end{cases},$$

where v is a constant, J1(*i,j*) represents the value of the pixel at coordinates (i,j) in the gamma image J1, and J(i,j) represents the value of the pixel at coordinates (i,j) in the contrast-enhanced image J.

In the formula, β is an adjustment coefficient, which is obtained by performing a related calculation based on the brightness value m1 and the brightness value m2. For each pixel in the contrast-enhanced image J, the corresponding adjustment coefficient β is the same.

The preset first grayscale threshold is a configured parameter value, which can be adjusted as needed, and v is a pre-configured constant. In the specific examples of the present invention, the preset first grayscale threshold $\in [10, 50]$ and the constant $v \in [10, 30]$.

Additionally, it should be noted that for step S32, since the input original image is usually a color image, it is necessary to perform a grayscale transformation on the preprocessed image S formed after denoising the original color image, in order to easily collect the required parameters.

By step S3 of the present invention, the contrast of the image can be enhanced. To avoid the image getting too dark after gamma transformation, step S32 is executed after step S31.

Preferably, as shown in FIG. 3, step S4 comprises: step S41, obtaining R, G, B three-channel images corresponding to the contrast-enhanced image J, and for each pixel in the contrast-enhanced image J, taking the maximum value of the pixel in the R, G, B three-channel images as the grayscale value to form a maximum value image $M_{max}$, and taking the minimum value of the pixel in the R, G, B three-channel images as the grayscale value to form a minimum value image $M_{min}$;

step S42, obtaining R, G, B three-channel images $M_c$ corresponding to the enhanced display image M based on the maximum value image $M_{max}$ and the minimum value image $M_{min}$; then:

$$M_c(i, j) = L + (J_c(i, j) - L) * (1 + K),$$

$$L = \frac{M(i, j)_{max} + M(i, j)_{min}}{2};$$

where, c=[R,G,B], representing one of the three channels R, G, B, K is a constant, $M_c(i, j)$ represents the value of the pixel at coordinates (i, j) in one of the R, G, B three-channel images corresponding to the enhanced display image M, $J_c$ (i,j) represents the value of the pixel at coordinates (i, j) in one of the R, G, B three-channel images corresponding to the contrast-enhanced image J, $M(i,j)_{max}$ represents the value of the pixel at coordinates (i, j) in the maximum value image $M_{max}$, and $M(i, j)_{min}$ represents the value of the pixel at coordinates (i, j) in the minimum value image M n;

step S43, merging three channels of the R, G, B three-channel images $M_c$ to form the enhanced display image M.

In a specific example of the present invention, K∈[0, 0.5] the differences between the three channels of the contrast-enhanced image J are analyzed by step S4, and the pixel distribution on each channel of the image is dynamically adjusted, so that the saturation of the displayed small intestine mucosa image is sharper and the image is prevented from deviating to red.

In an embodiment of the present invention, step S5 can be implemented through various algorithms, such as: sharpening the enhanced display image M using a Laplacian pyramid algorithm to form the sharpened image N.

In a preferred embodiment of the present invention, an improved guided filtering algorithm is used to sharpen the enhanced display image M to form the sharpened image N. Specifically, step S5 comprises:

step S51, extracting three-channel images $light_c$ of a brightness layer image for R, G, B three-channel images of the enhanced display image M using the guided filtering algorithm;

step S52, obtaining R, G, B three-channel images $N_c$ corresponding to the sharpened image N based on the three-channel images $light_c$ of the brightness layer image; then:

$$N_c(i, j) = M_c(i, j) + (M_c(i, j) - light_c(i, j)) * \alpha,$$

where, c=[R,G,B], representing one of the three channels R, G, B, α is a constant, $M_c(i, j)$ represents the value of the pixel at coordinates (i,j) in one of the R, G, B three-channel images corresponding to the enhanced display image M, $N_c(i, J)$ represents the value of the pixel at coordinates (i,j) in one of the R, G, B three-channel images corresponding to the sharpened image N, and $light_c(i, j)$ represents the value of the pixel at coordinates (i,j) in one of the three-channel images of the brightness layer image;

step S53, merging three channels of the R, G, B three-channel images $N_c$ to form the sharpened image N.

Extracting the three-channel images $light_c$ of the brightness layer image using the guided filtering algorithm in step S51 is prior art, and is not described in detail here.

In the specific examples of the present invention, a may be adjusted as needed, for example, α∈[0, 0.5].

Preferably, in order to reduce computational load and improve computational efficiency, in another embodiment of step S5 in the present invention, downsampling the enhanced display image M before step S51 to form a downsampled image;

replacing the enhanced display image M with the downsampled image when performing step S51; and after step S51, upsampling the three-channel images $light_c$ formed in step S51 to form three-channel images $light_c$ with the same size as the original image.

The enhanced display image M obtained in step S4 is sharpened in step S5, so that the villi texture details of the displayed small intestinal mucosa image are clearer and the image more natural.

In the embodiments of the present invention, step S6 may be implemented through various algorithms, such as: local histogram enhancement algorithm or Retinex enhancement algorithm.

In a preferred embodiment of the present invention, as shown in FIG. 4, an improved BIMEF (Bio-Inspired Multi-Exposure Fusion) algorithm is used to implement step S6. Specifically, step S6 comprises: step S61, obtaining the R, G, B three-channel images corresponding to the sharpened image N, and for each pixel in the sharpened image N, taking the maximum value corresponding in the R, G, B three-channel images as the grayscale value to form an initial image L1; step S62, performing mean filtering on the initial image L1 to form a light image L; step S63, calculating the total number of pixels P1 with grayscale values less than a preset second grayscale threshold in the light image L, if P1≤P, the sharpened image N is used as the output image E; and if P1>P, performing steps S64, S65, and S66 sequentially; where P is a preset determination threshold, which is a constant;

step S64, calculating a mean grayscale value mean of the pixels with grayscale values less than the preset second grayscale threshold in the light image L; and obtaining an exposure image G according to the mean grayscale value mean, then $$G(i, j) = beta * N(i, j)^q,$$

$$beta = \exp((1 - q) * b),$$

$$q = k^a;$$

$$k = 135/mean,$$

$$k = \max(1, \min(k, 7));$$

where, a and b are constants, beta, q, and k are dependent variables; G(i,j) represents the value of the pixel at coordinates (i,j) in the exposure image G; N(i,j) represents the value of the pixel at coordinates (i,j) in the sharpened image N;

step S65, obtaining R, G, B three-channel images $E_c$ corresponding to the output image E based on the exposure image G and the sharpened image N; then:

$$E_c(i, j) = N_c(i, j) * \omega + G_c(i, j) * (1 - \omega),$$

$$\omega = 1/L(i, j)^f;$$

$$f = \frac{P1}{w * h};$$

where, c=[R,G,B], representing one of the three channels R, G, B, P1 is a constant, $E_c(i,j)$ represents the value of the pixel at coordinates (i,j) in one of the R, G, B three-channel images corresponding to the output image E, $N_c(i, J)$ represents the value of the pixel at coordinates (i,j) in one of the R, G, B three-channel images corresponding to the sharpened image N, and $G_c(i, j)$ represents the value of the pixel at coordinates (i,j) in one of R, G, B three-channel images corresponding to the exposure image G, L(i, j) represents the value of the pixel at coordinates (i, j) in the light image L; w and h represent the width and height of the sharpened image N, respectively;

step S66, merging three channels of the R, G, B three-channel images $E_c$ to form the output image E.

In step S62, the mean filtering algorithm is the same as the one used in step S2. The difference lies in the range of values for the filtering algorithm parameter r. In step S62, r∈[15, 40].

In step S63, the preset second grayscale threshold is a configured parameter value, which can be adjusted as needed and P is a pre-configured constant. In the specific examples of the present invention, the preset second grayscale threshold ∈[50, 150], P∈[10000,30000].

In step S64, a and b are both pre-configured constants. In the specific examples of the present invention, α∈[−1,1] and b∈[0,2].

In step S65, f is actually the proportion of the total number of pixels P1 with grayscale values less than the preset second grayscale threshold in the light image L; ω is a weight coefficient, which is normalized to a value between 0 and 1.

In step S6, a dynamic range enhancement is performed on the sharpened image N that is obtained in step S5, to widen the pixel range of the darker small intestinal mucosa image or darker areas in the image, thus enhancing brightness, and improving natural visibility.

As shown in FIG. 5, the left is the original image, and the right is the output image formed after processing with the image processing method of the present invention. Through the example, it can be observed that after processing the original image with the image processing method of the present invention, the output display is more saturated, has good brightness, and the details of the villi on the surface of the small intestinal mucosa are clearer. The enhanced display image of the small intestinal mucosa will greatly shorten the review time and improve the review efficiency of physicians.

Further, the present invention provides an electronic device, comprising a memory and a processor, where the memory stores a computer program that can run on the processor, and the processor executes the computer program to implement steps of the image processing method.

Further, the present invention provides a computer-readable storage medium which stores a computer program and the computer program is executed by the processor to implement steps of the image processing method as described above.

In summary, the provided image processing method, electronic device, and readable storage medium enable multi-level processing on the original image and improve the display accuracy of the output image.

It should be understood that, although the description is described in terms of embodiments, not every embodiment merely comprises an independent technical solution. Those skilled in the art should have the description as a whole, and the technical solutions in each embodiment may also be combined as appropriate to form other embodiments that can be understood by those skilled in the art.

The series of detailed descriptions set forth above are only specific descriptions of feasible embodiments of the present invention and are not intended to limit the scope of protection of the present invention. On the contrary, many modifications and variations are possible within the scope of the appended claims.

The invention claimed is:

1. An image processing method, comprising:

obtaining an original image;

denoising the original image using an image filtering algorithm to form a preprocessed image S;

performing contrast enhancement in the preprocessed image S to form a contrast-enhanced image J;

adjusting saturation of the contrast-enhanced image J to form an enhanced display image M;

sharpening the enhanced display image M to form a sharpened image N; and performing dynamic range enhancement on the sharpened image N using a dynamic range image enhancement algorithm to form an output image, wherein the step "sharpening the enhanced display image M to form a sharpened image N" comprises:

step S51, extracting three-channel images $\text{light}_c$ of a brightness layer image for R, G, B three-channel images of the enhanced display image M using a guided filtering algorithm;

step S52, obtaining R, G, B three-channel images $N_c$ corresponding to the sharpened image N based on the three-channel images $\text{light}_c$ of the brightness layer image;

$$N_c(i, j) = M_c(i, j) + (M_c(i, j) - \text{light}_c(i, j)) * \alpha,$$

wherein, c=[R,G,B], representing one of three channels R, G, B, α is a constant, $M_c(i,j)$ represents the value of the pixel at coordinates (i,j) in one of the R, G, B three-channel images corresponding to the enhanced display image M, $N_c(i,j)$ represents the value of the pixel at coordinates (i,j) in one of the R, G, B three-channel images corresponding to the sharpened image N, and $\text{light}_c(i,j)$ represents the value of the pixel at coordinates (i,j) in one of the three-channel images of the brightness layer image;

step S53, merging three channels of the R, G, B three-channel images $N_c$ to form the sharpened image N;

wherein the method further comprises:

downsampling the enhanced display image M before step S51 to form a downsampled image;

replacing the enhanced display image M with the downsampled image when performing step S51; and after step S51, upsampling the three-channel images $light_c$ formed in step S51 to form three-channel images $light_c$ with the same size as the original image.

2. The image processing method of claim 1, wherein the step "denoising the original image using an image filtering algorithm to form a preprocessed image S" comprises:

taking a Gaussian filtering algorithm or a mean filtering algorithm as the image filter algorithm, representing the value of each pixel in the preprocessed image S as S (i,j), $$S(i,j)=\text{blur}(I(i,j),\text{size}(r,r)),$$

wherein, blur represents filtering function, I(i,j) represents the value of the pixel at coordinates (i,j) in the original image, size (r,r) represents the size of the filtering algorithm, r represents a filtering algorithm parameter, r is a constant, and its numerical value is related to the size of the original image and the noise level of the original image.

3. The image processing method of claim 1, wherein the step "performing contrast enhancement in the preprocessed image S to form a contrast-enhanced image J" comprises:

performing a gamma transformation on the preprocessed image S to form a gamma image J1; converting the preprocessed image S to a grayscale image S1, calculating the mean value of grayscale values of the grayscale image S1 to form a brightness value m1 corresponding to the preprocessed image S;

converting the gamma image J1 to a grayscale image J2, obtaining pixels in the grayscale image J2 with grayscale values greater than a preset first grayscale threshold, calculating the mean value of grayscale values of the obtained pixels to form a brightness value m2 corresponding to the gamma image J1;

obtaining the contrast-enhanced image J based on the gamma image J1, the brightness value m1 corresponding to the preprocessed image S, and the brightness value m2 corresponding to the gamma image J1;

$$J(i,j) = \beta * J1(i,j),$$

$$\beta = \begin{cases} 1, & m2 \geq m1 \\ \dfrac{\min(m1, m2+v)}{m2}, & m2 < m1 \end{cases},$$

wherein v is a constant, $J1(i,j)$ represents the value of the pixel at coordinates (i,j) in the gamma image J1, and J (i,j) represents the value of the pixel at coordinates (i,j) in the contrast-enhanced image J.

4. The image processing method of claim 1, wherein the step "adjusting saturation of the contrast-enhanced image J to form an enhanced display image M" comprises:

obtaining R, G, B three-channel images corresponding to the contrast-enhanced image J, and for each pixel in the contrast-enhanced image J, taking the maximum value of the pixel in the R, G, B three-channel images as the grayscale value to form a maximum value image $M_{max}$, and taking the minimum value of the pixel in the R, G, B three-channel images as the grayscale value to form a minimum value image $M_{min}$;

obtaining R, G, B three-channel images $M_c$ corresponding to the enhanced display image M based on the maximum value image $M_{max}$ and the minimum value image $M_{min}$;

$$M_c(i, j) = L + (J_c(i, j) - L) * (1 + K),$$

$$L = \frac{M(i, j)_{max} + M(i, j)_{min}}{2};$$

wherein, c=[R,G,B], representing one of three channels R, G, B, K is a constant, $M_c$ (i,j) represents the value of the pixel at coordinates (i, j) in one of the R, G, B three-channel images corresponding to the enhanced display image M, $J_c$ (i, j) represents the value of the pixel at coordinates (i, j) in one of the R, G, B three-channel images corresponding to the contrast-enhanced image J, $M(i,j)_{max}$ represents the value of the pixel at coordinates (i, j) in the maximum value image $M_{max}$, and $M(i, j)_{min}$ represents the value of the pixel at coordinates (i, j) in the minimum value image $M_{min}$;

merging three channels of the R, G, B three-channel images $M_c$ to form the enhanced display image M.

5. The image processing method of claim 1, wherein the step "sharpening the enhanced display image M to form a sharpened image N" comprises:

sharpening the enhanced display image M using a Laplacian pyramid algorithm to form the sharpened image N.

6. The image processing method of claim 1, wherein the dynamic range image enhancement algorithm is local histogram enhancement algorithm or Retinex enhancement algorithm.

7. The image processing method of claim 1, wherein the step "performing dynamic range enhancement on the sharpened image N using a dynamic range image enhancement algorithm to form an output image" comprises:

step S61, obtaining R, G, B three-channel images of the sharpened image N, and for each pixel in the sharpened image N, taking the maximum value corresponding in the R, G, B three-channel images as the grayscale value to form an initial image L1;

step S62, performing mean filtering on the initial image L1 to form a light image L;

step S63, calculating the total number of pixels P1 with grayscale values less than a preset second grayscale threshold in the light image L, wherein if P1≤P, the sharpened image N is used as the output image E; and if P1>P, performing steps S64, S65, and S66 sequentially; wherein P is a preset determination threshold, which is a constant;

step S64, calculating a mean grayscale value mean of the pixels with grayscale values less than the preset second grayscale threshold in the light image L; and obtaining an exposure image G according to the mean grayscale value mean, $$G(i, j) = \text{beta} * N(i, j)^q,$$

$$\text{beta} = \exp((1 - q) * b),$$

$$q = k^a;$$

-continued $$k = 135/\text{mean},$$

$$k = \max(1, \min(k, 7));$$

wherein, a and b are constants, G (i,j) represents the value of the pixel at coordinates (i,j) in the exposure image G, and N (i,j) represents the value of the pixel at coordinates (i,j) in the sharpened image N;

step S65, obtaining R, G, B three-channel images $E_c$ corresponding to the output image E based on the exposure image G and the sharpened image N;

$$E_c(i, j) = N_c(i, j) * \omega + G_c(i, j) * (1 - \omega),$$

$$\omega = 1/L(i, j)^f;$$

$$f = \frac{P1}{w * h};$$

wherein, c=[R,G,B], representing one of three channels R, G, and B, P1 is a constant, $E_c$ (i,j) represents the value of the pixel at coordinates (i, j) in one of the R, G, B three-channel images corresponding to the output image E, $N_c$ (i,j) represents the value of the pixel at coordinates (i, j) in one of the R, G, B three-channel images corresponding to the sharpened image N, $G_c$ (i,j) represents the value of the pixel at coordinates (i, j) in one of R, G, B three-channel images corresponding to the exposure image G, L (i,j) represents the value of the pixel at coordinate (i,j) in the light image L; w and h represent the width and height of the sharpened image N, respectively; f is the proportion of the total number of pixels P1 with grayscale values less than the preset second grayscale threshold in the light image L; ω is a weight coefficient, which is normalized to a value between 0 and 1;

step S66, merging three channels of the R, G, B three-channel images $E_c$ to form the output image E.

8. An electronic device, comprising a memory and a processor, wherein the memory stores a computer program that runs on the processor, and the processor executes the program to implement steps of the image processing method, wherein the image processing method comprises:

obtaining an original image;

denoising the original image using an image filtering algorithm to form a preprocessed image S;

performing contrast enhancement in the preprocessed image S to form a contrast-enhanced image J;

adjusting saturation of the contrast-enhanced image J to form an enhanced display image M;

sharpening the enhanced display image M to form a sharpened image N; and performing dynamic range enhancement on the sharpened image N using a dynamic range image enhancement algorithm to form an output image, wherein the step "sharpening the enhanced display image M to form a sharpened image N" comprises:

step S51, extracting three-channel images $\text{light}_c$ of a brightness layer image for R, G, B three-channel images of the enhanced display image M using a guided filtering algorithm;

step S52, obtaining R, G, B three-channel images $N_c$ corresponding to the sharpened image N based on the three-channel images $\text{light}_c$ of the brightness layer image;

$$N_c(i, j) = M_c(i, j) + (M_c(i, j) - \text{light}_c(i, j)) * \alpha,$$

wherein, c=[R,G,B], representing one of three channels R, G, B, $\alpha$ is a constant, $M_c$ (i,j) represents the value of the pixel at coordinates (i,j) in one of the R, G, B three-channel images corresponding to the enhanced display image M, $N_c$ (i,j) represents the value of the pixel at coordinates (i,j) in one of the R, G, B three-channel images corresponding to the sharpened image N, and $\text{light}_c$ (i,j) represents the value of the pixel at coordinates (i,j) in one of the three-channel images of the brightness layer image;

step S53, merging three channels of the R, G, B three-channel images $N_c$ to form the sharpened image N;

wherein the method further comprises:

downsampling the enhanced display image M before step S51 to form a downsampled image;

replacing the enhanced display image M with the downsampled image when performing step S51; and after step S51, upsampling the three-channel images $\text{light}_c$ formed in step S51 to form three-channel images $\text{light}_c$ with the same size as the original image.

\* \* \* \* \*